Patented Jan. 30, 1940

2,188,888

UNITED STATES PATENT OFFICE 2,188,888

CONDENSATION PRODUCT AND METHOD

Edwin T. Clocker, Bethlehem, Pa.

No Drawing. Application October 15, 1938,
Serial No. 235,252

20 Claims. (Cl. 260—405)

My invention relates to methods of producing an improved condensation product suitable for use in dispersing, wetting and softening agents, in resins and plastic masses, and for other similar purposes, and to the new product so produced. My invention also relates to the new methods of dispersing and the like.

This application is a continuation in part of my co-pending applications Serial No. 759,086, filed December 24, 1934; Serial No. 117,243, filed December 22, 1936, and Serial No. 165,898, filed September 27, 1937, all for Condensation product and method. Serial No. 759,086 includes the generic claims and certain species relating to the condensation of an acyclic olefinic acid having less than ten carbon atoms in the carbon chain, or its ester, with a nonconjugated unsaturated non-hydroxylated aliphatic acid having from ten to twenty-four carbon atoms in the carbon chain, or a salt or ester thereof. Serial No. 117,243 relates particularly to the maleic species. Serial No. 165,898 is directed to the production of salts and esters of the condensation product. Serial No. 165,899, filed September 27, 1937, for Condensation product and method includes the subject matter relating to recondensation. Serial No. 165,900, filed September 27, 1937, for Coating product and method, is concerned particularly with coating. Serial No. 231,759 filed September 26, 1938, for Condensation product and method is directed to the reaction product of the condensation product with a basic dyestuff. Serial No. 231,760, filed September 26, 1938 for Condensation product and method relates particularly to water-insoluble metallic salts of the condensation product. Serial No. 231,761, filed September 26, 1938, for Oily dispersion material is directed to a dispersion of oils, fats or waxes produced by the condensation product of the invention.

A purpose of my invention is to produce an improved condensation product by causing condensation between one of the group consisting of acyclic olefinic aldehydes, acyclic olefinic acids, esters of both and alkyl substituted derivatives of both, all having less than ten carbon atoms in their carbon chains and an oleic acid material, such as oleic acid or a glyceride of oleic acid. Any relatively short chain compound containing the ethylene linkage in condensable form may be condensed with oleic acid or its salts or esters.

A further purpose is to cause an acyclic olefinic aldehyde, acid, ester or alkyl derivative thereof, having less than ten carbon atoms in its carbon chain, to condense at the carbon chain of an oleic acid material by suitable application of heat, and, desirably also pressure. A temperature between 150° C. and 300° C. or higher is preferable for the reaction, 180° C. to 260° C. being the most satisfactory range.

A further purpose is to produce a salt or ester or a salt-ester of an acyclic olefinic acid or the like having less than ten carbon atoms in its carbon chain which is combined with the carbon chain of an oleic acid substance.

A further purpose is to produce an improved water-soluble compound for use in emulsifying oils and as a wetting and softening agent by forming a completed salt, acid salt or salt-ester of the condensation product of an acyclic olefinic aldehyde, acid, ester, or alkyl derivative thereof having less than ten carbon atoms in the carbon chain and an oleic acid material.

A further purpose is to employ the salt, acid salt or salt-ester of the condensation product of an acyclic olefinic aldehyde, acid, ester or alkyl derivative thereof, each having less than ten carbon atoms in the carbon chain and a substance predominantly consisting of an oleic acid material, such as olive oil, as a wetting or softening agent in the textile, leather, paper, printing ink and rubber industries, or as a bodying agent in the polishing, cutting and cosmetic industries, desirably mixing the condensation product with the oils and dispersing the mixture of the condensation product and other oils.

A further purpose is to employ the condensation product of an acyclic olefinic aldehyde, acid, ester or alkyl derivative thereof, each having less than ten carbon atoms in the carbon chain, and an oleic acid material, as a dispersing agent for paint films and a plasticizer for resins. The dispersing agent or plasticizer may be combined with a basic dyestuff.

A further purpose is to take advantage of the miscibility of the condensation product of an acyclic olefinic aldehyde, acid, ester of alkyl derivative thereof, each having less than ten carbon atoms in the carbon chain, and an oleic acid material, with nitrocellulose and other cellulose esters and cellulose derivatives, by using the condensation product as an ingredient of a coat which is to precede a cellulose ester lacquer coat in painting and similar work, or by incorporating the condensation product in a cellulose ester lacquer such as a nitrocellulose lacquer dissolved in ethyl alcohol-ethyl acetate, or by employing the condensation product as a plasticizer for a resin which is to be incorporated in a cellulose ester solution or material.

A further purpose is to employ a salt of the condensation product of maleic anhydride or the like and olive oil or other similar non-drying oil for detergent or other cleaning purposes.

Further purposes appear in the specification and in the claims.

It has been known for some time that maleic anhydride or substances yielding maleic anhydride will condense with carbon chain compounds containing a conjugated system of double bonds. For example Morrell, Marks and Samuels in British Patent No. 407,957 discloses a condensation of maleic anhydride with tung oil, a conjugated compound.

I have discovered that under suitable conditions, maleic anhydride and compounds which behave similarly, as discussed below, will react with compounds having a single olefinic linkage like oleic acid and its salts and esters, and the condensation product thus obtained may be used as produced, or formed into a wide variety of products depending upon the character of the reacting substances and the subsequent reactions to which the condensation product is subjected.

To produce the maleic condensation product, the maleic grouping must be present in condensable form, preferably as maleic anhydride. The condensation is of course obtained from any of the compounds which yield maleic anhydride and the like, such as, malic acid, fumaric acid, maleic acid, aconitic acid or citric acid, if subjected to the conditions under which maleic anhydride is produced. The production of maleic anhydride from such other acids is well known in the art (Bernthsen, Textbook of Organic Chemistry (1933) pages 250–256). Instead of maleic anhydride, an ester of maleic acid, whether an acid or a completed ester, or a substituted maleic acid having less than ten carbon atoms in its carbon chain may be used.

As explained herein, in order to avoid a mere esterification of alcohol groups, as distinguished from a condensation at the double bond, the fatty acid or similar compound should be nonhydroxylated. Oleic acid is of course nonhydroxylated. The invention is also applicable to other nonconjugated unsaturated nonhydroxylated non-drying oils.

In the case of hydroxylated non-drying oils, reaction with an acyclic olefinic material like maleic anhydride will proceed as esterification at the hydroxyl groups and no condensation will take place unless the reaction is continued beyond esterification and a sufficient quantity of maleic anhydride or similar material is present. The condensation after esterification then takes place.

Whenever reference is made herein to maleic anhydride, it will be understood that I include substances which yield maleic anhydride if subjected to the conditions at which maleic anhydride is produced. I also include substituted maleic acids having less than ten carbon atoms in their carbon chains, and their equivalents.

Whenever I refer herein to an acid or acid group, I of course include an acid anhydride and an acid anhydride group and vice versa. Whenever I refer to an ester I include also a half ester.

Investigation of a large number of compounds has shown that condensation with oleic acid materials is generally characteristic of carbon chain compounds having the ethylene linkage and having less than ten carbon atoms in the carbon chains, which are substituted on one or both sides of the double bond to form aldehydes, acids, or acid anhydrides or esters or half esters thereof, or similar compounds. These compounds are acyclic and have the ethylene linkage. Such acyclic olefinic compounds are mono-substituted when they contain only one aldehyde, acid, acid anhydride or esterified group, for example acrolein, crotonic acid, vinyl acetate. Such olefinic compounds are di-substituted when they contain two aldehyde, acid, acid anhydride or esterified groups, for example maleic anhydride, citraconic anhydride, maleic acid, methyl maleate.

When I refer to an acyclic olefinic compound of less than ten carbon atoms in the carbon chain, as having the ethylene linkage in condensable form, I mean to indicate that the compound is not a hydrocarbon, for example, but that it is an aldehyde, acid or acid anhydride, or an ester of half ester thereof, or a similar compound that will condense with a nonconjugated unsaturated nonhydroxylated fatty acid or the like having from ten to twenty-four carbon atoms in the carbon chain.

The longer the carbon chain of the acyclic olefinic aldehyde, acid or acid anhydride, or ester or half ester thereof or similar compound, the less vigorous is the condensation reaction. Thus at the upper limit (nine carbon atoms in the carbon chain) the reaction is relatively mild. If there are less than seven carbon atoms in the carbon chain (for example six) the reaction is more vigorous. A still more vigorous reaction is obtained if there are less than five carbon atoms in the carbon chain. In the case of an ester of an acyclic olefinic compound, the carbon chain of the olefinic compound should have less than ten carbon atoms, the carbon chain of the compound added by esterification not being counted.

In all cases where I refer in the specification to less than ten carbon atoms in the carbon chain of the acyclic olefinic compound, it will be understood that a more vigorous reaction is obtained with compounds having less than seven carbon atoms in the carbon chain and a still more vigorous reaction with compounds having less than five carbon atoms in the carbon chain. These later groups (less than seven and less than five) are to be taken as expressly included, although not specifically mentioned because of a desire to shorten the specification.

As will be explained in considerable detail, the presence of the acid or acid anhydride radical in the condensation product is distinctly advantageous, because of the reactions of which the acid or acid anhydride radical is capable and the uses to which such reactions may be put.

The reaction of the present invention may be obtained with any of a wide variety of nonconjugated unsaturated nonhydroxylated carbon chain compounds having from ten to twenty-four carbon atoms in the carbon chain, which may be present in non-drying oils. Esters of oleic acid with mono-, di- or poly-hydric alcohols, for example glyceryl or glycol esters, are particularly desirable. Free oleic acid may also be used. Salts of oleic acid (soaps) may likewise be employed.

When reference is made to the length of the carbon chain as being from ten to twenty-four carbon atoms, it is intended to include compounds having ten carbon atoms, twenty-four carbon atoms or any intermediate number of carbon atoms in the chain. The reference to the length of the carbon chain applies to the carbon chain of the acid. A tri-glyceride, for example, contains three such carbon chains united with glycerol.

In accordance with the present invention, the oleic acid material will usually be in the form of an oil whose predominant constituent is a glyceryl ester of oleic acid, such as olive, peanut (arachis), almond, neat's foot, pecan nut, lard or in the form of an ester of some other alcohol, for example a glycol ester. Olive oil is chiefly the triglyceride of oleic acid. When I say that the predominant constituent of the oil is the oleic acid material I mean that this comprises more than 50% of the compound.

It will further be understood that mixtures of various esters, or of esters and free fatty acids or of salts of the acids, may be employed if desired.

I do not include herein hydroxylated aliphatic acids, oils, etc. because while the condensation of my invention may in certain cases be obtained, precautions must be taken because of the tendency of hydroxylated fatty acids, oils, etc. to esterify and gell. A typical hydroxylated fatty oil is castor oil.

The question of whether the free fatty acid or the ester or the salt or other like compound is used in immaterial from the standpoint of the condensation reaction (except as to the question of solubility and physical properties of the material, which affect the rate of reaction) because the condensation reaction of the maleic anhydride or the like appears to involve the carbon chain at an intermediate point between its ends, rather than the carboxyl group or neutralized carboxyl group at the end of the chain. Of course, the character of the product will vary depending upon whether the acid, ester, or salt is used.

In the condensation I desirably employ one molecular equivalent of a cyclic olefinic aldehyde, acid or ester or alkyl derivative thereof to one molecular equivalent of oleic acid material and subject the mixture to a temperature between 150° C. and 300° C. (most desirably between 180° C. and 250° C.) and preferably also to high pressure to facilitate the reaction.

The temperature may in some cases be somewhat above 300° C. if the reaction components can stand such high temperature. Pressure may desirably be applied by simply confining the reaction components within the walls of some vessel such as a pressure autoclave and then heating the reaction components so that a pressure equal to the vapor pressure of the reaction components is applied. Pressure may also be applied in any other suitable way, as by pumping the reaction components into the vessel or introducing an inert gas under pressure. I have used pressures up to 300 pounds per square inch with success. Of course the desirable pressure will vary with the individual reaction.

The time of reaction will depend upon the temperature, the pressure, the concentration and the character of the reactants. In general where the reactions are carried out under atmospheric pressure, the minimum times of reaction for particular temperatures of reaction are:

| Temperature | Minimum time |
|---|---|
| 150° C | Several hours. |
| 200° C | One hour. |
| 230° C | Thirty minutes. |
| 250° C | Twenty minutes. |
| 300° C | Ten minutes. |

Naturally to assure results at any of these temperatures, the period of reaction will be at least 2 or 3 times the minimum.

It is recommended that for a temperature of 200° C. to 300° C., the reaction time be at least one hour.

A suitable catalyst may be used to accelerate the reaction and to increase the yield. I do not, however, find that a catalyst is necessary.

The condensation reaction may be carried out in the presence of suitable solvents, although this is not usually necessary.

While I ordinarily prefer to use a simple condensation reaction, it will be understood that a criss-cross condensation reaction can be employed, reacting one or a plurality of acyclic olefinic compounds with a plurality of oleic acid glycerides or the like, or reacting one or a plurality of oleic acid glycerides or the like with a plurality of acyclic olefinic compounds, thus building up peculiar and complex molecules by condensations at several double bonds.

In ordinary practice I prefer not to use sufficient acyclic olefinic aldehyde, acid, ester or alkyl derivative thereof, each having less than ten carbon atoms in the carbon chain, to saturate all of the double bonds in the oleic acid glyceride or the like. Generally it is sufficient to saturate one-third of the double bonds in oleic acid tri-glyceride. Thus in olive oil one-third of the double bonds is ordinarily saturated. But in individual cases it may be desirable to saturate more ethylene linkages in the fatty oil, and even to completely saturate them. To saturate all of the ethylene linkages in an oil predominantly consisting of glycerides of oleic acid like olive oil, three molecular equivalents of acyclic olefinic compound having less than ten carbon atoms in the carbon chain are caused to react with one molecular equivalent of olive oil.

Examples 1 to 5 given below clearly indicate the way in which my improved condensation product is obtained.

EXAMPLE 1

In a pressure autoclave 180 parts by weight of olive oil are mixed with 20 parts by weight of maleic anhydride. The temperature is maintained at from 230° C. to 260° C. for two hours, a pressure of about 30 pounds per square inch developing. The reaction may be obtained satisfactorily at 150° C., but is much slower at this low temperature, and the temperature may be raised to as much as 300° C. or even somewhat higher, but a high temperature may cause some difficulty due to carbonization. After cooling the reaction product is removed from the autoclave.

The condensation product is somewhat darker than the original olive oil and has an increased viscosity. The condensation product is miscible with a limited amount of warm alcohol (20%). It is precipitated by high dilution with petroleum ether after its preliminary ready solution in petroleum ether. The condensation product is completely miscible with benzene hydrocarbons. The condensation product is miscible with fatty oils and solutions of cellulose derivatives such as nitrocellulose in all proportions.

The iodine number and the saponification number are uncertain and not reliable. The acid number after removal of any uncombined maleic anhydride, is 48.6.

EXAMPLE 2

Into a three-neck flask, equipped with a thermometer, mechanical stirrer and reflux condenser, 200 parts by weight of distilled oleic acid and 60 parts by weight of maleic anhydride are placed and heat is applied until the temperature of the mixture reaches 180° C. The temperature is gradually raised from 180° C. to 250° C. over a period of one hour, during which time the amount of maleic anhydride condensed by the reflux condenser progressively diminishes. The temperature is maintained at 250° C. to 260° C. for five hours until no more maleic anhydride appears to condense under the reflux. The temperatures given are those found best for carrying out the reaction, although temperatures between 150° C. and 300° C., or somewhat higher, may be used.

The condensation product distills between 260–265° C. at a pressure of 2 millimeters of mercury. The acid number is 427.9. The molecular weight found experimentally is 377, the theoretical molecular weight being 375.3. The iodine number is uncertain, and may be about 68.4.

The condensation product is soluble in ethyl alcohol, ether, xylene, carbon tetrachloride and solutions of cellulose derivatives, such as nitrocellulose, but is substantially insoluble in petroleum hydrocarbons and fatty oils.

EXAMPLE 3

180 parts by weight of olive oil are mixed with 25 parts by weight of citraconic anhydride (a substituted maleic anhydride) and the mixture is heated in a three-neck flask equipped with a reflux condenser, at about 250° C. for about five hours. At the end of this period, no further citraconic anhydride appears to condense under the reflux, indicating completion of the reaction. As a precaution, heating is continued for about 15 minutes longer. The reaction product is generally similar to that obtained in Example 1.

EXAMPLE 4

A mixture of 25 parts by weight of olive oil and 2.4 parts by weight of crotonic acid (an acyclic olefinic acid) are heated under pressure at about 250° C. for about five hours. The condensation product has similar properties to the maleic-olive oil condensation product of Example 1, as respects solubility noted above, and dispersing power.

EXAMPLE 5

A mixture of 900 parts by weight of olive oil and 112 parts by weight of n-butyl maleate (a maleic ester) are heated in a pressure autoclave at about 250° C. for about one hour. The condensation product is a better plasticizer for nitrocellulose lacquers and other cellulose lacquers than the product of Example 1, and has wide utility as a plasticizer generally. By itself it is not film-forming, but may be included with film-forming materials.

Without limiting myself to any exact structure for the condensation product, it would appear that the condensation product is an addition product at a double bond in the carbon chain of the oleic acid material. For example if oleic acid reacts with maleic anhydride, the reaction may be as follows:

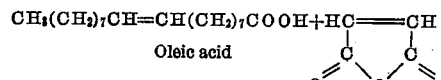
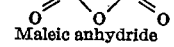
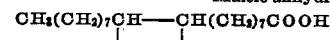
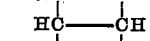
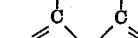
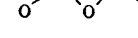
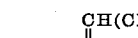
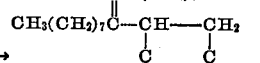
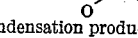
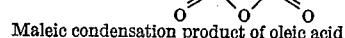

Of the above possible formulae, Formula (2), produced by molecular rearrangement of Formula (1), appears at present to be supported by the weight of the evidence as far as the condensation with oleic acid is concerned.

The reaction above will be modified in well known manner if a glyceryl ester of oleic acid instead of oleic acid be used, or if some other acyclic olefinic aldehyde, acid or acid anhydride, ester or half ester or alkyl derivative thereof, each having less than ten carbon atoms in its carbon chain, be used instead of or in mixture with maleic anhydride.

It should be noted that the olefinic acid or acid anhydride condensation product of oleic acid has a carboxyl group capable of reacting at the end of the carbon chain and also an olefinic acid group capable of reaction. The condensation will take place notwithstanding that both these groups have been esterified before the condensation reaction, but the presence of the unesterified polar-reactive groups is of great advantage for many purposes as later explained.

When maleic acid or a substance yielding maleic acid is condensed with oleic acid, it appears to change the maleic anhydride and the maleic anhydride condensation product results.

*Acid reactions*

As noted above, the acid group of the condensation product is capable of a wide variety of reactions to produce desirable products of various kinds.

A very desirable feature of my invention is the ability to produce dispersing agents for dispersing solids and emulsifying liquids. I have discovered that such a desirable dispersing agent may be obtained by producing a soluble salt, acid salt or salt-ester of the condensation product of maleic anhydride or the like and an oleic acid material. For dispersing purposes the soluble salt-ester of the maleic condensation product of a nonconjugated unsaturated nonhydroxylated nondrying fatty oil like olive oil is preferable.

Experimenting with the maleic anhydride condensation product of a nonconjugated unsaturated nonhydroxylated nondrying oil having from ten to twenty-four carbon atoms in its carbon chain, I have found that the completed salt in which the maleic nucleus has its acidic groups neutralized by an alkali metal base, for instance potassium or sodium hydroxide, or an organic base such as triethylamine, is a satisfactory dispersing agent. The acid salt, in which one acidic group is not neutralized and another is neutralized by an alkali metal base or organic base, is likewise a satisfactory dispersing agent. Also the salt-ester is satisfactory. The completed ester is not a good dispersing agent.

When reference is made in the claims to a salt in the present connection, it is intended to include completed salts, acid salts and salt-esters. The base used in forming the soluble salt may be an alkali metal base or an organic base.

In producing my desirable dispersing agent, I preferably esterify the maleic condensation product with the theoretical quantity of an aliphatic or aromatic alcohol to produce an acid ester and then neutralize the acid ester with a suitable base or alkali to form a water-soluble salt-ester. The resultant product is a water-soluble oil which when mixed with other oils produces an emulsion. Emulsions made in this way have been found to be very stable and very neutral. Such oil emulsions are used to advantage instead of sulphonated oil emulsions because the stability, wettability, solubility and dispersive power of the dispersing agent obtained by my invention is greater than in the case of sulphonated oils. Emulsions produced by my novel dispersing agents have the further advantage over sulphonated oil emulsions that they are not readily decomposed, and particularly do not liberate an acid group on decomposition as do the sulphonated oils, which liberate sulphuric acid upon decomposition.

Large quantities of sulphonated oils are now used for dispersing, wetting and softening agents in the textile, leather, paper, plaster and cement industries. My improved product is according to tests by me superior to the commonly used sulphonated oils for use as a dispersing, wetting and softening agent in these and other industries. In the textile field, my product may be used in delustering rayon, for example.

Using my novel dispersing agents, I have produced very satisfactory dispersions of carnauba wax in water, of petroleum hydrocarbons in water and of many vegetable oils, such as linseed, olive, neat's foot, castor, etc., in water.

My new dispersing agent is very desirable as a bodying agent in the making of polishes, cutting fluids and cosmetics. There are of course many other uses too numerous to mention.

EXAMPLE 6

To 50 parts by weight of the viscous oil obtained by the interaction of maleic anhydride and olive oil under conditions similar to those described for instance in Example 1 (1 molecular equivalent of maleic anhydride to 1 molecular equivalent of olive oil), are added 5 parts by weight of isoamyl alcohol and the ingredients are refluxed for one-half hour. Any suitable alcohol may be used for this esterification, although the quantity of alcohol used will of course depend upon the particular alcohol. The reaction produces an acid ester.

The product is neutralized with the theoretical amount of a base, preferably sodium or potassium hydroxide or carbonate in concentrated aqueous solution. The resultant oily product is miscible with water in all proportions and is likewise miscible in all proportions with fatty oils and petroleum hydrocarbons.

The salt-ester as prepared above may be added to any suitable fatty oil or petroleum hydrocarbon to produce dispersion.

The acid ester may be added to the disperse phase before neutralization, and neutralization may be accomplished in the presence of the disperse phase.

EXAMPLE 7

To a water-insoluble hydrocarbon, alcohol, or fatty oil, such as olive oil, castor oil, etc., or wax such as carnauba or candelilla, the soluble salt-ester of the maleic-oleic condensation product as prepared in the last example is added until the ester forms 20% of the mixture. This mixture is readily emulsified with water due to the presence of the water-soluble salt-ester, and will remain in suspension over an indefinitely long period of time. Such dispersions having a minimum quantity of dispersing agent have remained in suspension and shown no tendency to cream after a year's standing.

If the water-soluble oil as obtained in the present example is boiled with water for one to five hours, the product is not decomposed with the concomitant separation of oil.

The emulsion of olive oil dispersed by the water-soluble oil as obtained in the present example is very satisfactory as a wetting and softening agent for the textile, leather, and paper industries.

An ester of the condensation product may be hydrolyzed or partially hydrolyzed and then neutralized to produce a dispersing agent.

The next four examples give specific illustrations of the product of the invention as a dispersing agent in polishes and cleaners. The actual material employed is the potassium isoamyl salt ester of the condensation product of maleic anhydride and olive oil in which the quantity of maleic anhydride is 10% of the weight of the oil. The ingredients in each case are simply mixed in an emulsifier.

EXAMPLE 8

A very desirable automobile polish has been produced using the following ingredients:

| | Parts by weight |
|---|---|
| Olive oil maleic complex, potassium isoamyl salt ester | 10 |
| Mineral oil | 30 |
| Pumice powder | 5 |
| Amyl alcohol | 10 |
| Carnauba wax | 5 |
| Water | 40 |
| Total | 100 |

EXAMPLE 9

A very desirable neutral shoe polish or shoe cream is obtained using the following composition:

| | Parts by weight |
|---|---|
| Olive oil maleic complex, potassium isoamyl salt ester | 5 |
| Carnauba wax | 6 |
| Candelilla wax | 3 |
| Ceresin wax | 3 |
| Turpentine | 5 |
| Lemongrass oil | 0.5 |
| Light mineral oil | 1 |
| Water | 100 |
| Total | 123.5 |

Example 10

A very satisfactory furniture polish has the following composition:

| | Parts by weight |
|---|---|
| Olive oil maleic complex, potassium isoamyl salt ester | 3 |
| Carnauba wax | 10 |
| Borax | 2 |
| Turpentine | 1 |
| Water | 90 |
| Total | 106 |

Example 11

A satisfactory leather cleaner and polish has been made using the following proportions:

| | Parts by weight |
|---|---|
| Olive oil maleic complex potassium isoamyl salt ester | 7.5 |
| Tri sodium phosphate | 0.5 |
| Beeswax | 6 |
| Carnauba wax | 6 |
| Turpentine | 36 |
| Pine oil | 4 |
| Turpineol | 2 |
| Water | 160 |
| Total | 222.0 |

The condensation product of an acyclic olefinic aldehyde, acid, ester or alkyl derivative thereof, having less than ten carbon atoms in its carbon chain and an oleic acid compound may desirably be used as a plasticizer for coating films such as nitrocellulose lacquer films, and as a plasticizer for resins.

The condensation product of the present invention is desirably employed in paint films as a levelling agent, in which case it may comprise a small amount of the nonvolatile vehicle, for example 1% to 3%. Where a condensation product of an acyclic olefinic acid having less than ten carbon atoms in the carbon chain and an oleic acid compound is employed, the dispersing agent has the desirable property of increased wettability for pigment, so that the pigment may be mixed with the oily vehicle more easily and quickly and will be slower to settle out of the vehicle. Particularly where the pigment is of a basic nature, the tendency of the acidic dispersing agent is greatly to assist in maintaining a stable dispersion. Where the acidic dispersing agent is employed, it also enhances the levelling properties. The tendency of the dispersing agent to penetrate permeable mediums like wood more rapidly than the remainder of the vehicle is avoided, as the acidic dispersing agent has the desirable property of remaining with the pigment.

The condensation product of the invention may be incorporated with resins as a plasticizer and its emulsifying tendency may be used to advantage in such cases. The material of the invention may be employed with any of a wide variety of well-known resins to plasticize them, as for example phenol-formaldehyde, cresol-formaldehyde, urea-formaldehyde, polybasic-acid-polyhydric-alcohol, ester gum and a wide variety of natural resins such as rosin. The quantity of plasticizer used may be from 1 to 20% of the weight of the resin. Where the resin is being employed for a special purpose, the soluble dispersing agent of Example 6 may be employed as a dispersing agent and also a plasticizer of the resin when the composition is dry.

An important property of the product of the present invention both from the standpoint of its use as a plasticizer for coating films and its use as a plasticizer for resins, is that cellulose esters such as nitrocellulose, ethyl cellulose, and cellulose acetate, in their ordinary solvents, are miscible with the oily condensation product; for example, the condensation product of an acyclic olefinic aldehyde, acid or ester or alkyl derivative thereof, each having less than ten carbon atoms in its carbon chain and an oleic acid compound such as a nonhydroxylated nondrying oil predominantly consisting of glycerides of oleic acid. The condensation product of the present invention will therefore be used to great advantage as a plasticizer for cellulose plastics.

A very important feature of the condensation product of the present invention is its detergent action for removing oils, fats, greases and the like. The sodium salt of the maleic anhydride condensation product of olive oil, as an example, is both a soap and a desirable emulsifying agent. The compound can be rendered neutral by satisfying any remaining acidic groups through combination with more alkali metal or by esterification. The water-soluble salt of the condensation product of a nonhydroxylated nondrying oil predominantly consisting of glycerides of oleic acid may be employed very satisfactorily.

Water-insoluble salts of the condensation product of the present invention with a nonhydroxylated nondrying oil predominantly consisting of glycerides of oleic acid, or other oleic acid compound, may be prepared by combining an acidic condensation product with a metallic compound such as the oxide or hydroxide of calcium, lead or aluminum or other metal which forms a water-insoluble salt.

Where the condensation product of an oleic acid compound is desirably colored, I will cause an acidic group to combine with a basic dyestuff such as a basic dye or dye base to develop the color. This is desirable particularly in the case of plasticizers for coating films and plasticizers for resins, although it is also sometimes desirable in the case of emulsifying agents.

The condensation product of maleic anhydride or the like and an oil predominantly consisting of an oleic acid compound is preferably used. The acidic group of the maleic anhydride or the like develops the color more effectively and economically than does the acidic group of the fatty acid. The reaction may be brought about directly or in the presence of a suitable solvent.

Example 12

A solution of one part by weight of Victoria blue dye base in 10 parts by weight of hot toluene is mixed with 100 parts by weight of the maleic anhydride-olive oil condensation product of Example 1. The blue color of the dye is developed by the acid anhydride group of the condensation product.

Some of the basic dyestuffs which may be used for example instead of Victoria blue to produce colored condensation products are:

Red

Magenta.
Safranine.
Rhodamine.
Toluidine red.

*Violet*

Crystal violet.
Paraphenylene violet.

*Blue*

Methylene blue.
Victoria blue (already mentioned).
Night blue.
Paraphenylene blue.

*Yellow*

Leather yellow.
Chrysoidine.

*Green*

Malachite green.
Brilliant green.
Azine green.

*Brown*

Bismark brown.

The esters of the condensation product of an oleic acid compound and maleic anhydride or the like exhibit desirable properties. They will be made with either aliphatic or aromatic alcohols, and the alcohols will be either mono-, di- or poly-hydric. Typical examples of esterification are reaction of the maleic anhydride-olive oil condensation product with methyl alcohol, ethyl alcohol, glycerine or ethylene glycol.

Where reference is made to poly-hydric alcohols, it is intended to include di-hydric alcohols. Under the designation poly-hydric alcohols, it is intended to include substituted poly-hydric alcohols, such as glycol monoethyl ether. Reference to acids is intended to include acid anhydrides and half esters of acids. Reference to esters is intended to include partially completed esters such as half esters.

It will be understood that the condensation of minute amounts of the olefinic compound with the nonconjugated unsaturated nonhydroxylated fatty compound will not appreciably change the character of the latter. In most cases at least 1% (based on the weight of the condensation product) of the olefinic compound should be combined with the nonconjugated unsaturated nonhydroxylated fatty compound in the product to insure a distinctive character of the product.

I believe that I am the first to disclose that oleic acid and its compounds will condense with acyclic olefinic aldehydes, acids, esters or alkyl derivatives thereof, each having less than ten carbon atoms in its carbon chain.

In view of my invention and disclosure variations and modifications to meet individual whim or particular need will doubtless become evident to others skilled in the art, to obtain all or part of the benefits of my invention without copying the exact process or product described, and I, therefore, claim all such insofar as they fall within the reasonable spirit and scope of my invention.

Having thus described my invention, what I claim as new and desire to secure by Letters Patent is:

1. The process of forming a condensation product, which comprises reacting one of the group consisting of acyclic olefinic aldehydes, acyclic olefinic acids, esters of both and alkyl substituted derivatives of both, all having less than ten carbon atoms in their carbon chains, with a nonconjugated unsaturated nonhydroxylated nondrying oil at a temperature in excess of 150° C. and in the presence of not substantially more than enough of said one of the group to saturate the double bond or bonds in the nondrying oil.

2. The process of producing a condensation product, which comprises reacting one of the first group consisting of acyclic olefinic aldehydes, acyclic olefinic acids, esters of both and alkyl substituted derivatives of both, all having less than ten carbon atoms in their carbon chains, with one of the second group consisting of oleic acid, salts and esters thereof, at a temperature of between 150° C and 300° C.

3. The process of producing a condensation product, which comprises condensing one of the group which consists of acyclic olefinic aldehydes, acyclic olefinic acids, esters of both and alkyl substituted derivatives of both, all having less than ten carbon atoms in their carbon chains, with olive oil at a temperature between 150° C. and 300° C.

4. The process of producing a condensation product, which comprises reacting one of the first group which consists of acyclic olefinic aldehydes, acyclic olefinic acids, esters of both and alkyl substituted derivatives of both, all having less than ten carbon atoms in their carbon chains, with one of the second group consisting of oleic acid, salts and esters thereof, at a temperature between 200° C. and 300° C. and for a time of at least one hour.

5. The process of producing a condensation product, which comprises reacting one of the first group which consists of acyclic olefinic aldehydes, acyclic olefinic acids, esters of both and alkyl substituted derivatives of both, all having less than ten carbon atoms in their carbon chains, with one of the second group consisting of oleic acid, salts and esters thereof, at a temperature above 150° C. and at a pressure above atmospheric pressure.

6. The process of producing a condensation product, which comprises reacting an acyclic olefinic acid having less than ten carbon atoms in its carbon chain with one of the group consisting of oleic acid, salts and esters thereof, at a temperature in excess of 150° C.

7. The process of producing a condensation product, which comprises reacting an acyclic olefinic acid having less than ten carbon atoms in its carbon chains with olive oil at a temperature of between 200° C. and 300° C. for a time of at least one hour.

8. The process of forming a condensation product, which comprises reacting maleic anhydride at an intermediate point in the carbon chain of a nonconjugated unsaturated nonhydroxylated nondrying oil at a temperature in excess of 150° C. and in the presence of not substantially more than enough of the maleic anhydride to saturate the points of unsaturation in the nondrying oil.

9. A condensation product comprising the product of reaction of one of the group consisting of acyclic olefinic aldehydes, acyclic olefinic acids, esters of both and alkyl substituted derivatives of both, all having less than ten carbon atoms in their carbon chains, with a nonconjugated unsaturated nonhydroxylated nondrying oil, at a temperature in excess of 150° C. in the proportions of not substantially more than enough of said one of the group to combine with all of the combining capacity of the oil.

10. A condensation product comprising the reaction product of one of the first group consisting of acyclic olefinic aldehydes, acyclic olefinic acids, esters of both and alkyl substituted derivatives of both, all having less than ten carbon atoms in their carbon chains, with one of the second group consisting of oleic acid, salts and esters thereof, at a temperature in excess of 150° C.

11. A condensation product predominantly consisting of the product of condensation of one of the group consisting of acyclic olefinic aldehydes, acyclic olefinic acids, esters of both and alkyl substituted derivatives of both, all having less than ten carbon atoms in their carbon chains, combined at an intermediate point of the carbon chain of a glyceride of oleic acid.

12. A condensation product predominantly consisting of the product of reaction of one of the group consisting of acyclic olefinic aldehydes, acyclic olefinic acids, esters of both and alkyl substituted derivatives of both, all having less than ten carbon atoms in their carbon chains, and olive oil at a temperature in excess of 150° C.

13. A condensation product predominantly consisting of a product of reaction of one of the group consisting of acyclic olefinic aldehydes, acyclic olefinic acids, esters of both and alkyl substituted derivatives of both, all having less than ten carbon atoms in their carbon chains, and oleic acid at a temperature in excess of 150° C.

14. A condensation product predominantly consisting of the product of reaction of one of the group consisting of acyclic olefinic aldehydes, acyclic olefinic acids, esters of both and alkyl substituted derivatives of both, all having less than ten carbon atoms in their carbon chains, and a substance predominantly consisting of a glyceride of oleic acid combined at an intermediate point of the oleic acid group, in the proportions of one molecular equivalent of one of the group to one molecular equivalent of the oleic acid material.

15. A condensation product predominantly consisting of oleic acid material with an acyclic olefinic acid having less than ten carbon atoms in its carbon chain chemically combined at a point intermediate of the carbon chain of the oleic acid group.

16. A condensation product predominantly consisting of a glyceride of oleic acid with an acyclic olefinic acid having less than ten carbon atoms in its carbon chain chemically combined at a point intermediate of the carbon chain of the oleic acid group.

17. A condensation product predominantly consisting of olive oil with an acyclic olefinic acid having less than ten carbon atoms in its carbon chain chemically combined at a point intermediate of the carbon chain of the oleic acid portion of the glyceride molecule.

18. A condensation product predominantly consisting of olive oil with maleic anhydride chemically combined to the oleic acid portion of the molecule of glyceride of oleic acid.

19. A condensation product comprising the product of reaction of maleic anhydride at an intermediate point in the carbon chain of the fatty acid of a nonconjugated unsaturated nonhydroxylated nondrying oil, in proportions of not substantially more than enough of the maleic anhydride to saturate the nondrying oil.

20. A condensation product predominantly consisting of olive oil with crotonic acid chemically combined to the oleic acid portion of the molecule of glyceride of oleic acid.

EDWIN T. CLOCKER.